Aug. 23, 1966
A. T. FLOWER ETAL
3,267,503
COATING CUTTER TOOL
Filed June 17, 1965
2 Sheets-Sheet 2
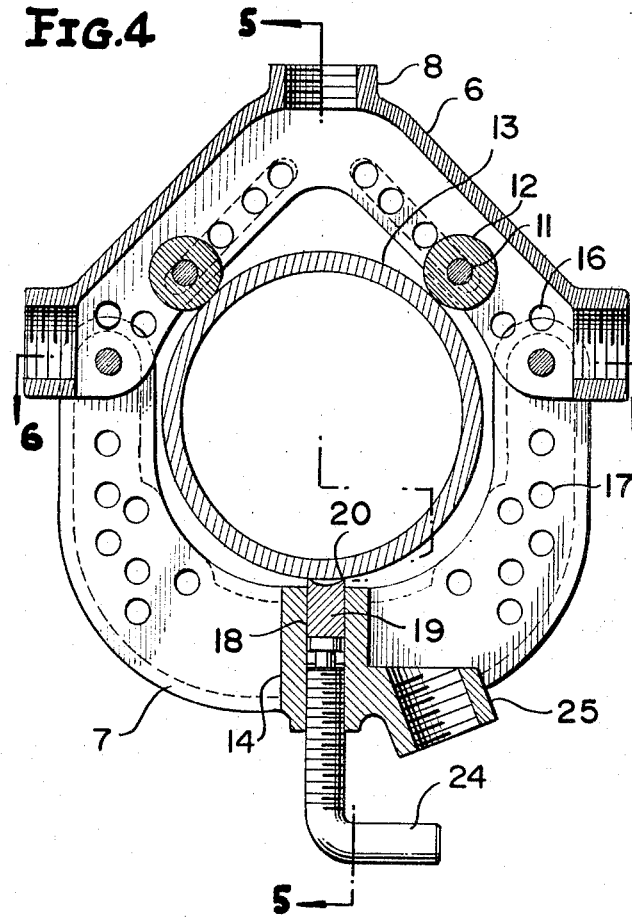
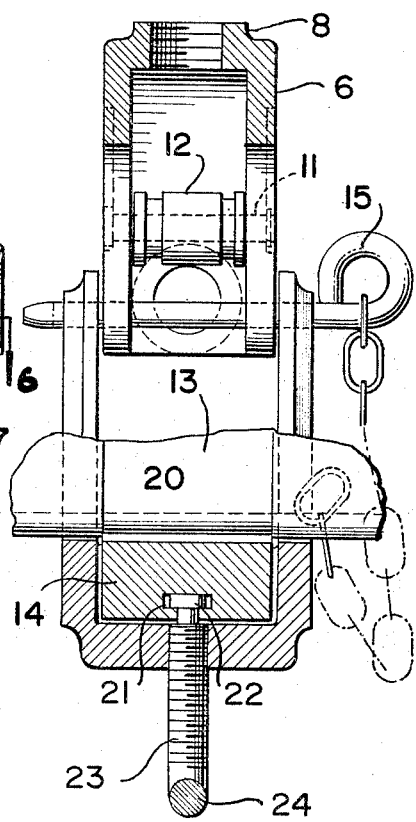
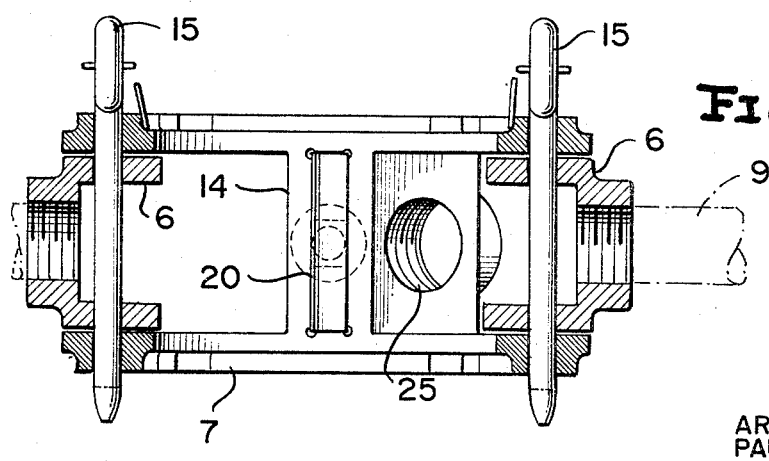
INVENTORS
ARCHIBALD T. FLOWER
PAUL GANSER &
DAVID L. BUCHANAN
BY Ralph Burch
ATTORNEY

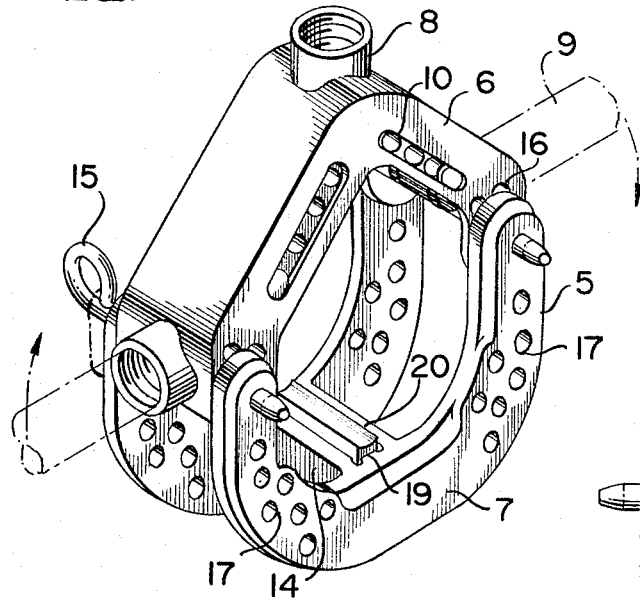
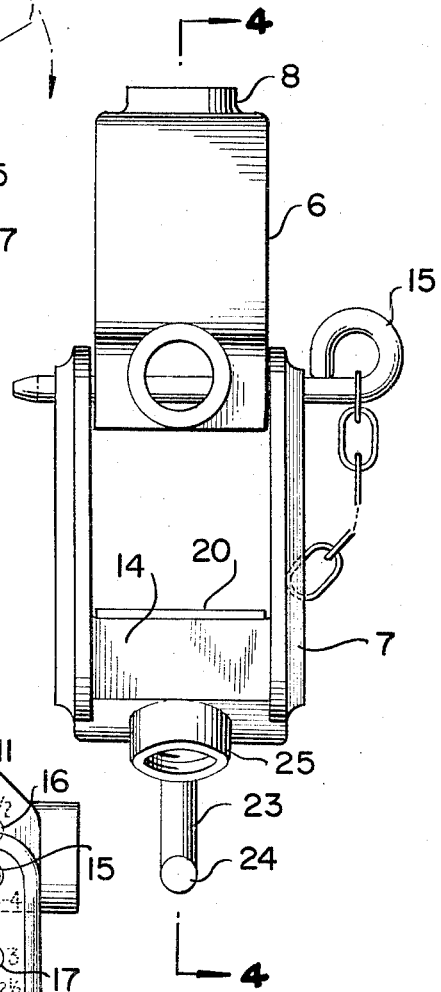
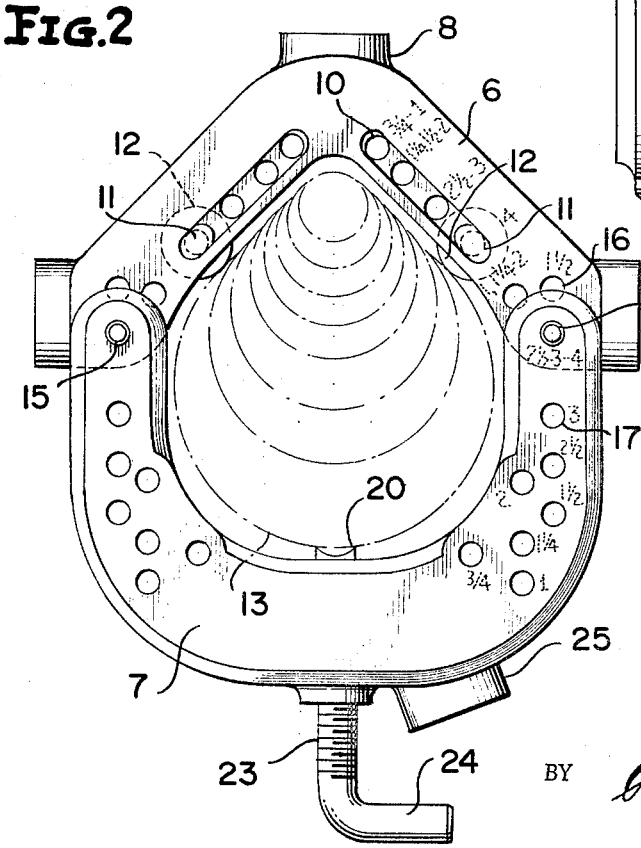

United States Patent Office 3,267,503
Patented August 23, 1966

3,267,503
COATING CUTTER TOOL
Archibald T. Flower, 2637 Church Road, Glenside, Pa.;
Paul Ganser, 108 W. Clearfield Road, Havertown, Pa.;
and David L. Buchanan, 6333 Valley Green Road,
Flourtown, Pa.
Filed June 17, 1965, Ser. No. 464,748
8 Claims. (Cl. 15—104.04)

This invention relates to a tool for removing a coating, such as plastic, from pipe without damaging the material of the pipe.

The tool comprises a V-shape member and U-shape member having their ends adjustably joined together to surround pipes of different diameters. The V-shape member has an adjustable roller mounted in each leg for supporting the member in spaced rolling contact with the surface of the pipe. The U-shape member supports a cutter blade intermediate its ends which is adjustable for contact with the surface of the pipe to be cleaned. Upon rotating the tool around the pipe the cutter blade removes the coating from the pipe to permit sections of the pipe to be joined by welds or couplings.

It is an object of the invention to provide a tool which is rigid in construction and is adjustable to fit pipes of various diameters.

A further object of the invention resides in providing a tool having adjustable members for surrounding a pipe which is freely rotatable around the pipe, one of the members having rollers for supporting the member in rolling contact with the pipe and the other member supporting a cutter blade in contact with the surface of the pipe for scraping the surface of the pipe upon rotation of the tool.

Other objects and advantages of the invention will be apparent during the course of the following description.

In the accompanying drawings, forming a part of this specification and in which like numerals are employed to designate like parts throughout the same:

FIG. 1 is a perspective view of the tool,
FIG. 2 is a front view of the tool,
FIG. 3 is an edge view of the tool,
FIG. 4 is a section taken on line 4—4 of FIG. 3,
FIG. 5 is a section taken on line 5—5 of FIG. 4, and,
FIG. 6 is a section taken on line 6—6 of FIG. 4.

Referring to the drawing wherein for the purpose of illustration the preferred embodiment of the invention is shown the numeral 5 denotes the body of the tool which encircles the pipe to be cleaned. The body comprises a V-shape member 6 and U-shape member 7 having their ends adjustably joined together to encircle pipes of various diameters. The member 6 is U-shape in cross section and at each end, and intermediate its ends, is provided with a laterally projecting screw threaded socket 8 to receive a handle 9. Each leg of the V-shape member 6 is provided with a row of spaced openings 10 in its side walls to receive the shaft 11 of a roller 12, the shaft being removable to position the roller in any of the openings for contact with the surface of a pipe 13 depending on its diameter.

The U-shape member 7 has spaced apart side walls connected together, intermediate their ends, by a transverse web 14 and the free ends of the side walls straddle the free ends of the V-shape member 6 and are connected thereto by removable pins 15. The ends of the member 6 are provided with a series of openings 16 for selective register with a series of openings 17 in the side walls of member 7 to receive the pins 15 to permit adjustment of the members 6 and 7 to fit pipes of various diameters.

The web 14 is provided with a groove 18 in its upper end to slidably receive a cutter blade 19, the upper face of the blade being transversely curved to provide cutter edges 20. The lower end of the cutter is provided with a T-slot 21 to receive the head 22 of an adjusting screw 23 threaded in the lower end of the web 14, the screw being provided with a handle 24 at its free end for adjusting the screw to raise and lower the cutter into engagement with the pipe 13. At one side of the web 14 a screw threaded socket 25 is disposed at an angle to the web for connecting a handle thereto for rotating the cutter around the pipe.

In operation, the members 6 and 7 are moved together or apart to bring the openings 16 and 17 into register and then inserting the pins 15 to hold the members together. The rollers 12 carried by the member 6 are mounted in a pair of the openings 10 depending on the diameter of the pipe to be scraped or cleaned. With the pipe 13 disposed between the members 6 and 7 the cutter blade 19 is adjusted by screw 23 to bring the cutting edges 20 into contact with the surface of the pipe 13. With the tool in operative position, handles are inserted in the sockets 8 and 25 for rotating the tool around the pipe so that the cutter removes the coating from the pipe without gouging the material of the pipe.

It is to be understood that the form of the invention herein shown and described is a preferred example of the same and changes in the shape, size and arrangement of the parts may be made without departing from the spirit of the invention or scope of the subjoined claims.

Having thus described our invention, we claim:

1. A tool for removing a coating from a pipe comprising a pair of members adjustably joined together to surround the pipe, rollers adjustably mounted along the inner sides of one of said members so as to permit said rollers to be adjusted for rolling contact with the surface of pipes of different diameter and a cutter carried by the other member for engagement with the surface of the pipe.

2. A tool as described in claim 1 wherein said members are provided with sockets to receive handles for rotating said members.

3. A tool for removing a coating from a pipe comprising a pair of members disposed on opposite sides of the pipe, having legs disposed in straddling relation and adjustable to move said members together and apart, rollers adjustably mounted along the inner sides of the legs of one of said members so as to permit said rollers to be adjusted for rolling contact with the surface of pipes of different diameter and a cutter adjustably mounted in the other member for engagement with the surface of the pipe.

4. A tool for removing a coating from a pipe comprising a pair of members disposed on opposite sides of the pipe, having legs disposed in overlapping relation and having a series of spaced openings, the openings of one member being disposed for selective register with the openings of the other member to receive a fastener, rollers adjustably mounted along the inner sides of the legs of one of said members so as to permit said rollers to be adjusted for rolling contact with the surface of pipes of different diameter and a cutter adjustably mounted in the other members for engagement with the surface of the pipe.

5. A tool for removing a coating from a pipe comprising a V-shape member, a U-shape member, means joining the ends of said members together so that the members surround the pipe, rollers adjustably mounted longitudinally of the legs of said V-shape member so as to permit said rollers to be adjusted for rolling contact with the surface of pipes of different diameter, and a cutter blade mounted in the center of said U-shape member for contact with the surface of the pipe.

6. A tool as described in claim 5 having a plurality of sockets extending laterally from said members to receive a handle for rotating said members around the pipe.

7. A tool for removing a coating from a pipe comprising a V-shape member, said member being U-shape in cross section, rollers disposed between the side walls of said member on opposite sides of the apex of said member for rolling contact with the surface of the pipe, a U-shape member composed of spaced apart side walls, the ends of said walls overlapping the ends of the side walls of said V-shape member, the side walls of said members having a series of openings for selective register with each other to receive a fastener for securing said members in surrounding relation to the pipe, a web extending between the walls of said U-shape member, opposite the apex of said V-shape member, having a groove in its upper end, and a cutter blade slidably mounted in the groove of said web, and a screw shaft threaded in the lower end of said web having connection with said cutter blade for projecting said blade from said groove into contact with the surface of the pipe.

8. A tool as described in claim 7 having a plurality of sockets projecting laterally from said members to receive a handle for rotating said members around the pipe.

References Cited by the Examiner

UNITED STATES PATENTS

| | | | |
|---|---|---|---|
| 640,751 | 1/1900 | Corwin | 15—104.01 X |
| 1,003,442 | 2/1911 | Eck | 15—104.01 X |
| 1,491,847 | 4/1924 | Creed | 15—104.01 X |
| 1,601,139 | 9/1926 | Morgal | 15—104.01 X |
| 1,715,289 | 5/1929 | Hellman | 15—104.01 |
| 2,508,291 | 5/1950 | Porro | 15—104.04 |

FOREIGN PATENTS 129,492  2/1901  Germany.

CHARLES A. WILLMUTH, *Primary Examiner.*

E. L. ROBERTS, *Assistant Examiner.*